United States Patent [19]

Caballero Pichardo

[11] Patent Number: 5,587,113

[45] Date of Patent: Dec. 24, 1996

[54] DEVICE FOR THE TREATMENT OF POLLUTED WATER

[76] Inventor: Antonio Caballero Pichardo, Calle de la Amargura No. 15 Lomas de la Herradura C.P., 52785 Huixquilucan, Mexico

[21] Appl. No.: 420,760

[22] Filed: Apr. 12, 1995

Related U.S. Application Data

[62] Division of Ser. No. 320,567, Oct. 11, 1994, which is a continuation of Ser. No. 10,144, Jan. 28, 1993, abandoned.

[51] Int. Cl.$^6$ ........................................... C02F 1/74
[52] U.S. Cl. ................... 261/116; 261/DIG. 75
[58] Field of Search ............... 261/116, DIG. 70, 261/DIG. 75, DIG. 54, DIG. 22; 210/620, 621, 622; 55/525; 417/151, 197, 312, 313

[56] References Cited

U.S. PATENT DOCUMENTS

| | | |
|---|---|---|
| 153,453 | 7/1874 | Miller . |
| 1,526,179 | 2/1925 | Parr et al. .................. 261/DIG. 75 |
| 1,878,582 | 9/1932 | Hellmer . |
| 1,894,696 | 1/1933 | Lindmann .................. 261/116 |
| 2,515,600 | 7/1950 | Hayes ...................... 261/116 |
| 4,936,552 | 6/1990 | Rothrock .................. 261/DIG. 75 |

FOREIGN PATENT DOCUMENTS

| | | | |
|---|---|---|---|
| 800069 | 6/1936 | France | ............... 261/116 |

*Primary Examiner*—Matthew O. Savage
*Attorney, Agent, or Firm*—Vaden, Eickenroht & Thompson, L.L.P.

[57] ABSTRACT

An apparatus for aerating polluted water is disclosed herein. The apparatus includes a tubular section defining a primary chamber having an opening in the side for admission of air from the surrounding atmosphere. A principle distribution chamber for receiving water to be aerated is connected to an upper peripheral edge of the tubular section and delivers water to a plurality of high speed nozzles that deliver accelerated sprays into the primary chamber. A tapering section is connected to a lower peripheral edge of the tubular section. A venturi section is connected to the lower peripheral edge of the tapering section. A single drain pipe including an upper peripheral edge is connected to a lower peripheral edge of the venturi and constitutes the sole outlet of the device. The nozzles create an air water mixture in the primary chamber and are directed toward the venturi to create a suction effect thereby drawing additional air into the primary chamber through the inlet orifice.

2 Claims, 11 Drawing Sheets

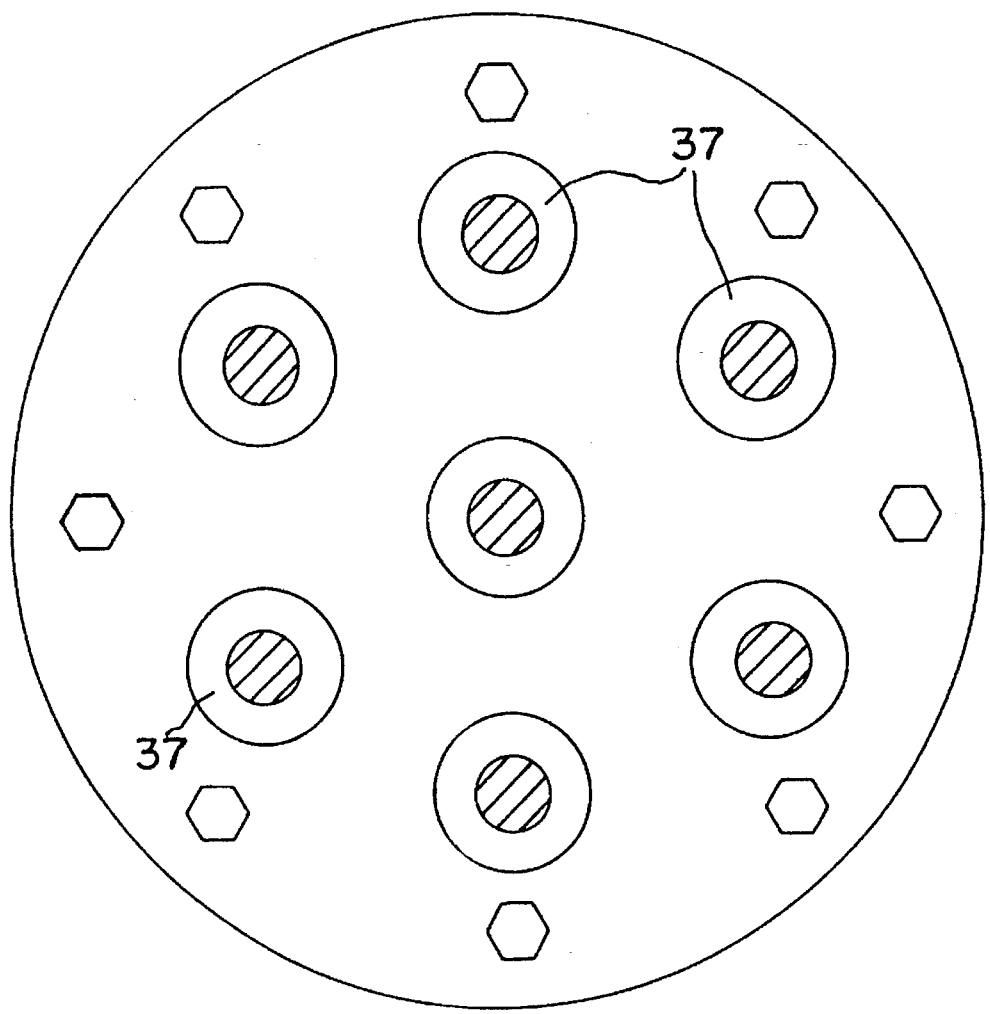
F I G. 4
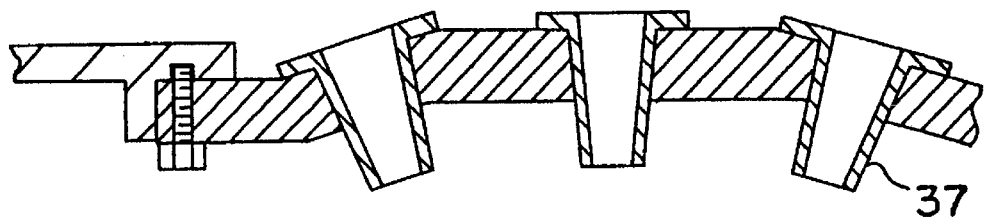
F I G. 5

DEVICE FOR THE TREATMENT OF POLLUTED WATER

This application is a divisional of continuation application U.S. Ser. No. 08/320,567, filed Oct. 11, 1994, by Antonio Caballero, entitled "DEVICE AND METHOD FOR THE TREATMENT OF POLLUTED WATER", still pending, which is a continuation application of parent application U.S. Ser. No. 08/010,144, filed Jan. 28, 1993, by Antonio Caballero Pichardo, entitled "DEVICE AND METHOD FOR THE TREATMENT OF POLLUTED WATER" now abandoned.

TECHNICAL FIELD

The present invention relates to water pollution control devices. More particularly, the present invention relates to apparatus and methods for the aeration of polluted water.

BACKGROUND ART

During the treatment of waste water or polluted water, it is often necessary to aerate the water. As used herein, the terms "waste water" and "polluted water" are used interchangeably. During the process of aeration, a sufficient amount of oxygen is furnished to the water so as to allow the elimination of contaminants by multiplying aerobic bacteria in the water being treated. This plays an important part in the degradation process of the organic wastes contained in the water.

The uncontrolled growth of the world's population has simultaneously produced a problem of great magnitude. This problem is an insufficient supply of water needed to satisfy the demand for water. The irrational use of water, and its pollution, has appreciably aggravated the supply of water. The pollution of water through the lack of control of contaminated industrial waste has made obsolete the natural systems traditionally used to assist in the decontamination of water, such as river channels. Such river channels are no longer sufficient to degrade the organic material from sewage discharges.

In an attempt to solve this problem, the installation of industrial plants to treat the waste water has been promoted. However, the percentages of organic and fecal matter have increased to the point that these plants, which were initially efficient, have now been overcome by the problem and have been left idle because of poor results. As an example, over half of the waste water treatment plants which were installed in Mexico have fallen into disuse. The rest of such waste water treatment plants have been operating with great deficiencies and inefficiencies.

There are various techniques that can be used for the introduction of air into the water for the purpose of aerating the waste water. For example, mechanical waterfalls have been used to break up the water in a fashion similar to the flow in rivers and streams. Unfortunately, this action is not sufficient because the channels in rivers and streams contain abundant spaces and unevenness. These are conditions that cannot be obtained in a treatment plant of this type. In the treatment plants, such spaces are reduced and the unevenness or drops are limited. In this manner, the aeration of the water in these mechanical waterfalls has been very low in comparison with that obtained in the channels of rivers or streams.

Aeration tanks have been used for the purpose of treating polluted water. In aeration tanks, water passes through a tank with orifices. The intent of this process is that the liquid absorbs the air entering through these holes. Since this action is considered natural, not forced, the air does not penetrate the flow of water because the water offers resistance. Consequently, the results of this device discourage its use.

Another technique used for the treatment of polluted water is the use of agitators and mechanical revolving devices. These can be subdivided into two types: (1) the surface agitator and (2) the submerged revolving device. The surface water agitator is installed in a tank with previously calculated dimensions. The action of the agitator breaks up the water so as to force it to take in air from the surface. Although this action is efficient, it is limited to aerating the water located within a few centimeters of the surface. Unfortunately, it is unable to agitate the deeper water. Subsequently, there is no aeration and the transference of oxygen to all of the water in the tank is not accomplished. Consequently, although this device permits a good assimilation of air to the surface water, it has the disadvantage of providing almost no aeration at the bottom of the tank. The surface water agitator also has the disadvantage of creating a "short circuit." When the surface water is sufficiently aerated, it promotes the reproduction of aerobic bacteria. However, on the bottom of the tank, the desired aeration is not found. As such, the reproduction of anaerobic bacteria occurs. This causes the "short circuit" since the oxidizing enzymes from the aerobic bacteria kill the anaerobic bacteria and vice versa.

The submerged revolving device is an apparatus which moves water from the deeper parts. Unfortunately, large amounts of electricity are required so as to break up the water. Without this large amount of power, the agitation is not performed in the required efficient manner so as to obtain the necessary aeration. This device requires a high consumption of electrical current so as to achieve a vigorous agitation of the water to be treated. The high power consumption of such a device presents a great disadvantage.

Air blowers have been used for the aeration of water. Various types of air blowers have been employed in the past in an attempt to achieve the proper aeration of water. Air blowers are devices that can supply large amounts of air at relatively low pressure. This presents a great disadvantage since water, an element which presents more resistance than air, does not allow the air to penetrate easily. Consequently, the results of water aeration through the use of air blowers has been deficient.

Compressors and turbo compressors have been used in an effort to find an apparatus that could efficiently furnish air to water for the purposes of oxygenating polluted water. These devices introduce air at higher pressures. This equipment requires a high consumption of electrical energy so as to achieve its purposes. From a cost-benefit analysis, the use of compressors and turbo compressors cannot be justified for the treatment of waste water or for the treatment of polluted water.

It is evident that all of the devices described hereinabove have attempted to solve the problem by introducing air to water. This has resulted in various complications. Because of the density difference between water and air, the water will present resistance to the introduction of air. In order to reach this objective, an expensive piece of equipment is required which can consume a large amount of energy. Additionally, whenever air is introduced in the water using high pressure, the air enters at high velocity and exits to the surface at practically the same velocity. Under these conditions, little oxygen is yielded to the water. It is doubtful that the results justify the investment.

It is an object of the present invention to provide a device and method for the treatment of contaminated water which is both efficient and economical.

It is another object of the present invention to provide a method and apparatus for the treatment of water which maximizes the surface area available for contact between the oxygen and the air.

It is a further object of the present invention to provide a method and apparatus for the treatment of polluted water which relies on natural reactions between water and air.

It is still a further object of the present invention to provide an apparatus and method for the treatment of waste water which is more cost-effective than conventional equipment.

It is still a further object of the present invention to provide a waste water treatment device which is easily adaptable to the various conditions which apply at the site.

These and other objects and advantages of the present invention will become apparent from a reading of the attached specification and appended claims.

SUMMARY OF THE INVENTION

The present invention is a device for the treatment of polluted water that comprises a primary chamber, a principal distribution chamber having an inlet connected to a source of polluted water, a secondary distribution chamber connected to a supply of polluted water, an air inlet orifice formed in the primary chamber so as to allow air to pass into the primary chamber, a venturi connected in fluid communication with the primary chamber, and a drain pipe connected to the venturi for allowing an air/water mixture to flow from the outlet of the venturi. The principal distribution chamber has a plurality of spray nozzles connected thereto and positioned into the primary chamber. The spray nozzles serve to pass polluted water into the primary chamber. The secondary distribution chamber has a plurality of high-speed nozzles positioned within the primary chamber. These high-speed nozzles serve to pass the polluted water into the primary chamber. The venturi is positioned below the primary chamber. The venturi serves to accelerate the flow of the air/water mixture passing from the primary chamber.

The principal distribution chamber is a circular body which extends around the circumference of the primary chamber. The principal distribution chamber has a plurality of spray nozzles which are positioned into the primary chamber. The secondary distribution chamber is positioned within the primary chamber. The secondary distribution chamber has an inlet extending through the primary chamber to the supply of polluted water. The principal distribution chamber and the secondary distribution chamber are arranged independently of each other within the primary chamber. The source of polluted water for both the principal distribution chamber and the secondary distribution chamber are the same. The high-speed nozzles of the secondary distribution chamber are directed downwardly toward the venturi. The venturi has a wide portion connected to the primary chamber. The venturi narrows in diameter from the wide portion toward the drainpipe.

The principal distribution chamber has an inspection door which is removably connected thereto. The inspection door allows physical access to the interior of the principal distribution chamber. Similarly, the secondary distribution chamber has a second inspection door removably connected thereto. The secondary inspection door enables physical access to the secondary distribution chamber. In a like manner, the primary chamber has an inspection door which is removably connected thereto. This inspection door allows physical access to the interior of the primary chamber.

The air inlet orifice has a protective screen extending thereover. The air inlet orifice is positioned along the top of the primary chamber. The protective screen has a size and configuration suitable for impeding the passage of foreign matter therethrough.

The present invention is also a method of treating polluted water which comprises the steps of: (1) passing a flow of polluted water through spray nozzles into a primary chamber; (2) introducing another flow of polluted water through a high-speed nozzle into the primary chamber; (3) drawing air into the primary chamber; (4) accelerating a flow of polluted water and air through a venturi so as to mix the polluted water with the air; and (5) drawing the mixed air/water from an outlet of the venturi.

The step of passing a flow includes the steps of distributing the flow of polluted water around a circumference of the primary chamber and spraying the polluted water through the spray nozzles into the primary chamber. The step of passing another flow includes the steps of accumulating the polluted water in a secondary distribution chamber within the primary chamber and spraying the polluted water downwardly through the high-speed nozzles toward the venturi. The spray nozzles associated with the primary distribution chamber pass a greater volume of polluted water than the high-speed nozzles associated with the secondary distribution chamber. The flows of polluted water come from the same source. The step of drawing occurs simultaneously with the step of accelerating. The step of drawing includes the step of cavitating the air/water mixture so as to maximize a volume of air relative to the volume of water.

In general, the present invention is a cylindrical body furnished with a pair of inlets for the entrance of the water to be treated. The first inlet distributes the water into the primary distribution chamber where the pressure is homogenized. Then the water is distributed to a series of spray nozzles so as to allow the polluted water to be distributed in the form of a mist or spray. These nozzles are strategically and geometrically placed around the primary distribution chamber. The second inlet introduces the water into the secondary distribution chamber where the pressure is homogenized and the water is distributed to various nozzles. These nozzles are of the "filled cone" type. These nozzles serve to accelerate the water so as to project it at high speed to the venturi. The venturi produces an acceleration of the water which, upon exiting the narrow portion of the venturi, creates a suction effect which drags with it the air/water mixture formed inside the primary chamber. At the same time, the air in the mixture is drawn through an orifice located in the upper section of the primary chamber.

BRIEF DESCRIPTION OF THE DRAWINGS

FIG. 4 is a top view of the plate where the nozzles of the secondary distribution chamber are positioned.

FIG. 5 is a cross-sectional side view of the nozzles of the secondary distribution chamber.

DETAILED DESCRIPTION OF THE INVENTION

Figure 1:
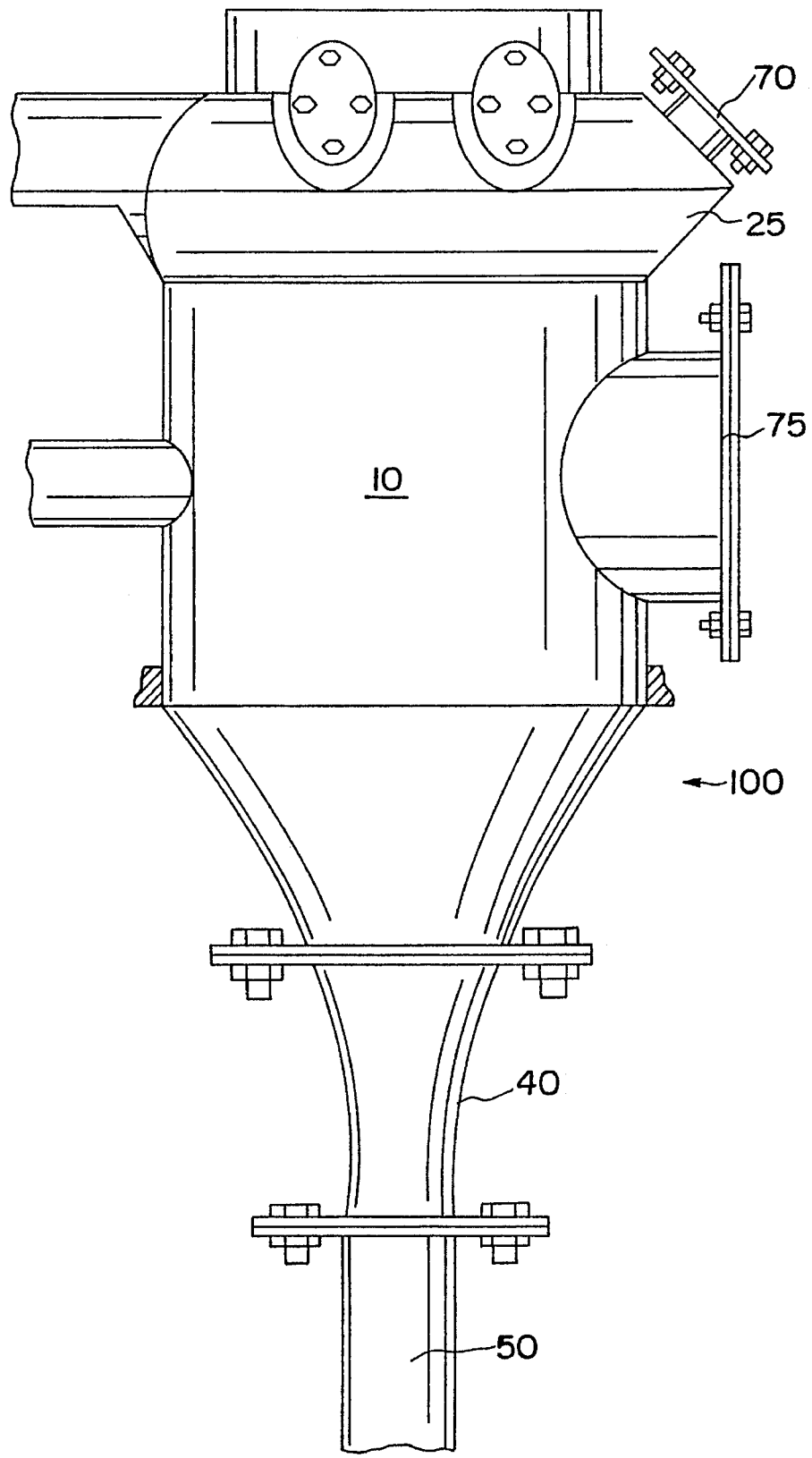
FIG. 1 is a side view of the aerator device in accordance with the preferred embodiment of the present invention.
Figure 2:
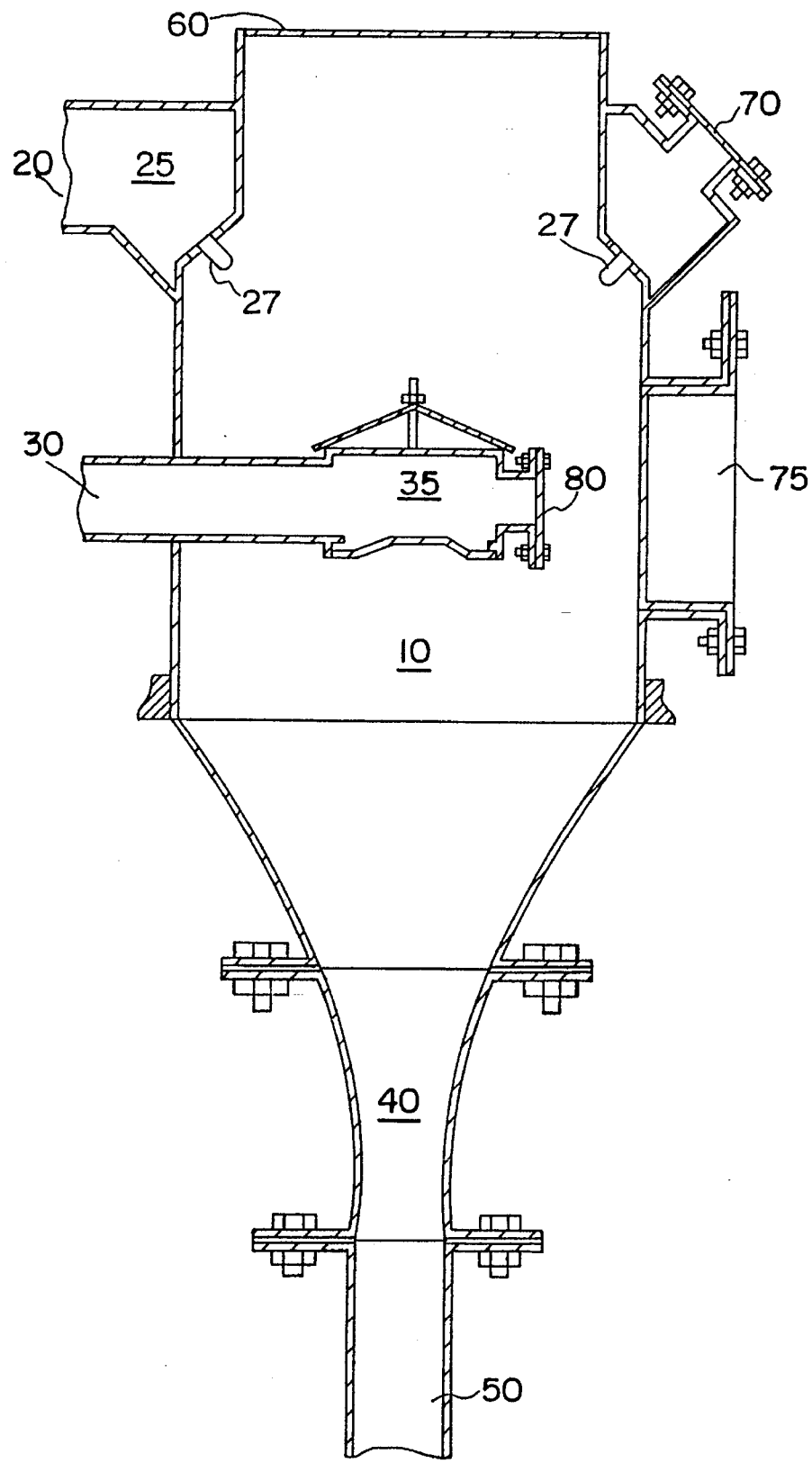
FIG. 2 is a cross-sectional side view of the present invention.

The aeration device 100 is comprised of a generally cylindrical body having a primary chamber 10. The primary chamber 10 is connected to a second section 15 which contains a narrow portion tapering to the lower end of the device. This lower end of the device is a venturi system 40. The venturi system 40 is described hereinbelow. The aeration device, as shown in FIG. 1, has a primary inlet 20 located at the top, for water being treated. The device 100 also has a second inlet 30, also for water being treated, placed essentially at the center of the device 100.

Both of the inlets 20 and 30 are connected to a common supply line for water to be treated (not shown). This line accommodates the flow to both inlets. Inlet 20 is connected to a principal distribution chamber 25 of circular dimension. The principal distribution chamber 25 is equipped with several spray nozzles 27. The water enters the primary chamber 10 through the nozzles 27. The water is broken up and projected in an atomized condition into the primary chamber 10 of the device 100. Inlet 30 is connected to a secondary distribution chamber 35. Secondary distribution chamber 35 is equipped with a system of high-speed nozzles 37. These nozzles 37 provide high velocity to the water as it exits the nozzles and enters the venturi system 40 of the device 10.

The water is distributed through the supply pipe to the chambers 25 and 35 where the pressure of the liquid is homogenized. The primary distribution chamber 25 receives approximately seventy-five percent of the flow. The primary distribution chamber 25 distributes the water among the spray nozzles 27 installed therein. These nozzles break up the water in such a way that it enters the primary chamber 10 in a mist form. The quantity of nozzles is determined by the volume and pressure of water to be treated. This arrangement obtains a homogeneods and finely-divided mixture so as to enhance the oxygenation of the water.

The secondary distribution chamber 35 receives the balance of the flow, approximately twenty-five percent. The secondary distribution chamber 35 is positioned centrally of the primary chamber 10. The secondary chamber 35 passes the water through the nozzles 37 installed therein. The nozzles 37 are of the cone type. These cone-type nozzles cause the water to pass through the tapered hole of each nozzle. The tapered hole of each nozzle causes the water to acquire a high velocity and, subsequently, projects the water to the lower part of the primary chamber 10 and toward the venturi system 40.

When the water is projected into the venturi system 40, it leaves the nozzles 37, exiting at high speed, and acquires a higher acceleration on its path toward the outlet. The outlet is the narrowest part of the device 100. The high-velocity water outlet produces a reaction of the same magnitude and in the opposite direction. This reaction is the suction of the air/water mixture which has been accumulated in the primary chamber 10 of the device 100. The water takes the air/water mixture along with it as it exits through the drainpipe 50. This same suction resupplies the primary chamber 10 of the device 100 with the air that enters through the orifice 60. The orifice 60 is equipped with a protective screen 65 so as to prevent the entrance of foreign particles that could affect the operation of the aeration device 100 of the present invention.

For the purposes of inspecting the interior of the aeration device 100, the device 100 is furnished with inspection doors 70 and 75 at the level of the primary distribution chamber 25 and the secondary distribution chamber 35, respectively. These inspection doors 70 and 75 can be removed or opened so that physical access to the interior of the chambers 25 and 35 can be obtained. These inspection doors can also be used so as to observe the conditions of cleanliness. It is important to be able to inspect the interior of the device 100 so as to prevent the obstruction and to maintain the general operation of the nozzles 27 and the nozzles 3,4. The secondary distribution chamber 35 contains an inspection door so as to provide access to the nozzles. Each of these inspection doors is attached using conventional methods which facilitate their removal and replacement (e.g., bolts, nuts, washers, packing, etc.).

With respect to the venturi system 40, the venturi system is a generally conical section whose narrow portion is calculated such that it causes an acceleration of the water which passes inside. Once the water flow passes through the narrowest section, it expands again and falls through the pipe 50 into a sump placed at a preselected distance. This preselected distance will vary with the altitude above sea level at which the device is installed.

As mentioned previously, the narrowing of the cone of the venturi system 40 produces an acceleration of the water. This acceleration is in addition to the acceleration caused by gravity acting on the water. The acceleration is of such a magnitude that a reaction in the opposite direction occurs so as to create a suction which drags the air/water mixture, previously accumulated in the primary chamber 10 of the device 100. Cavitation also occurs between the air and the water as it passes through the venturi.

The arrangement of the invention which has been described above and which is shown in FIGS. 1–7 provides the most efficient aeration that can be achieved. This aeration is accomplished through the use of three separate processes of water aeration. The first aeration is achieved when the water passes through the series of nozzles 27. When the water passes through nozzles 27, the water becomes atomized, sprayed, or in mist form. The second aeration occurs to the flow of water by the effects of the suction created when the water is accelerated by passing through the narrow portion of the venturi cone. Through the suction process, the flowing water drags air out of the mixture formed in the primary chamber 10. According to tests carried out on the mixture of air and water contained in the main chamber, compositions of 24 and up to 30 parts of air per part of water were reported. These compositions occurred at favorable conditions at sea level. The third aeration is produced when the water falls into a sump, with a previously calculated depth. This aeration occurs because, as the air attempts to free itself from the water in which it is trapped, the mixture falls through the drainpipe from a height of approximately 7.2 meters (23.6 feet). When it is freed, the air produces a large quantity of bubbles. The water will then have a high probability of absorbing all of the oxygen that will dissolve within the water.

Although the above arrangement is the most efficient, such an arrangement is not always necessary. For example, for less flow volume or less contaminated water, it will not be necessary to use this embodiment. Consequently, three other more economical arrangements are presented herein for water flows of lesser volume.

FIGS. 8 through 13 correspond to three variations of the present invention. The technical characteristics of these variations of the contaminated water aeration device of the present invention are generally equivalent to those described under the preferred embodiment, as described in FIGS. 1–7.

Figure 8:
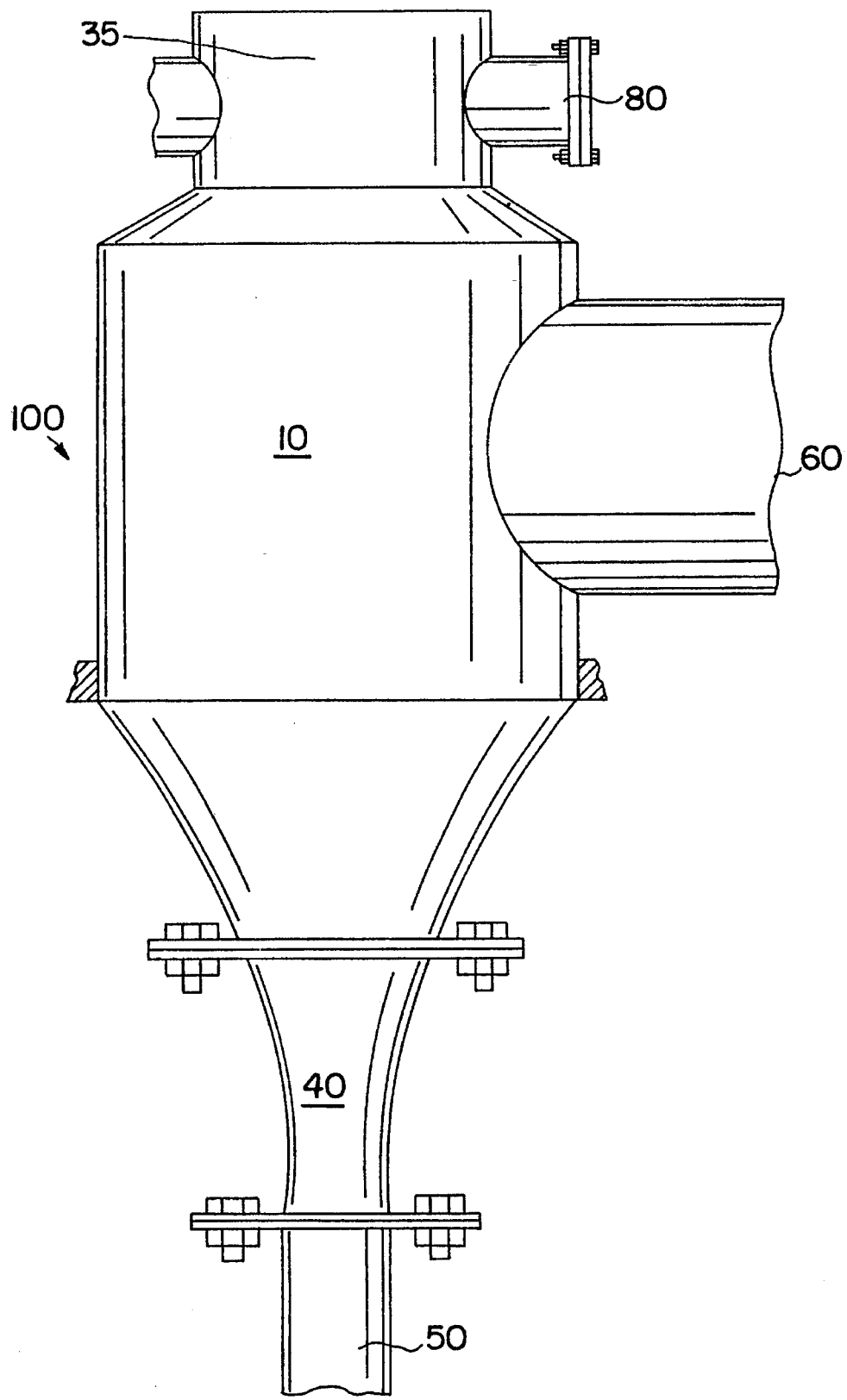
FIG. 8 shows an alternative embodiment of the aeration device of the present invention.
Figure 9:
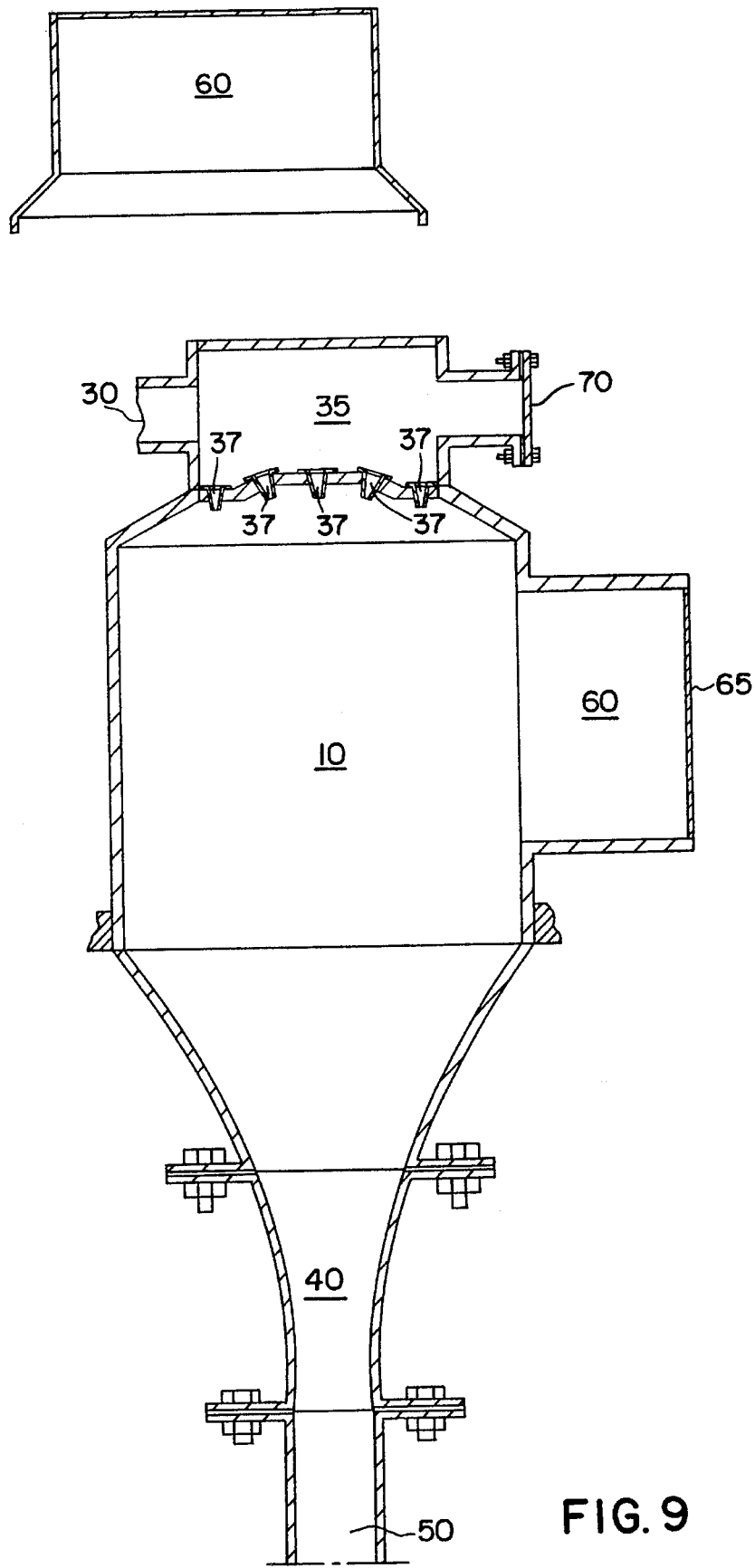
FIG. 9 is a cross-sectional side view of the alternative embodiment of the present invention as shown in FIG. 8.

The variation illustrated in FIGS. 8 and 9 differs from the first in that, in the second embodiment, the mixture does not include a primary distribution chamber 25, nor the spray nozzles 27. Also, secondary distribution chamber 35 and the high velocity nozzles 37 are located in the top part of the device such that the orifice or opening 60 for the air inlet is placed at the side of the main section of the primary chamber. For this embodiment, a large number of high velocity nozzles are provided so as to produce a large pull of air due to the narrowing of the cone section. This must occur because water is not being sprayed or atomized as in the manner described in conjunction with the preferred embodiment of the present invention.

Figure 10:
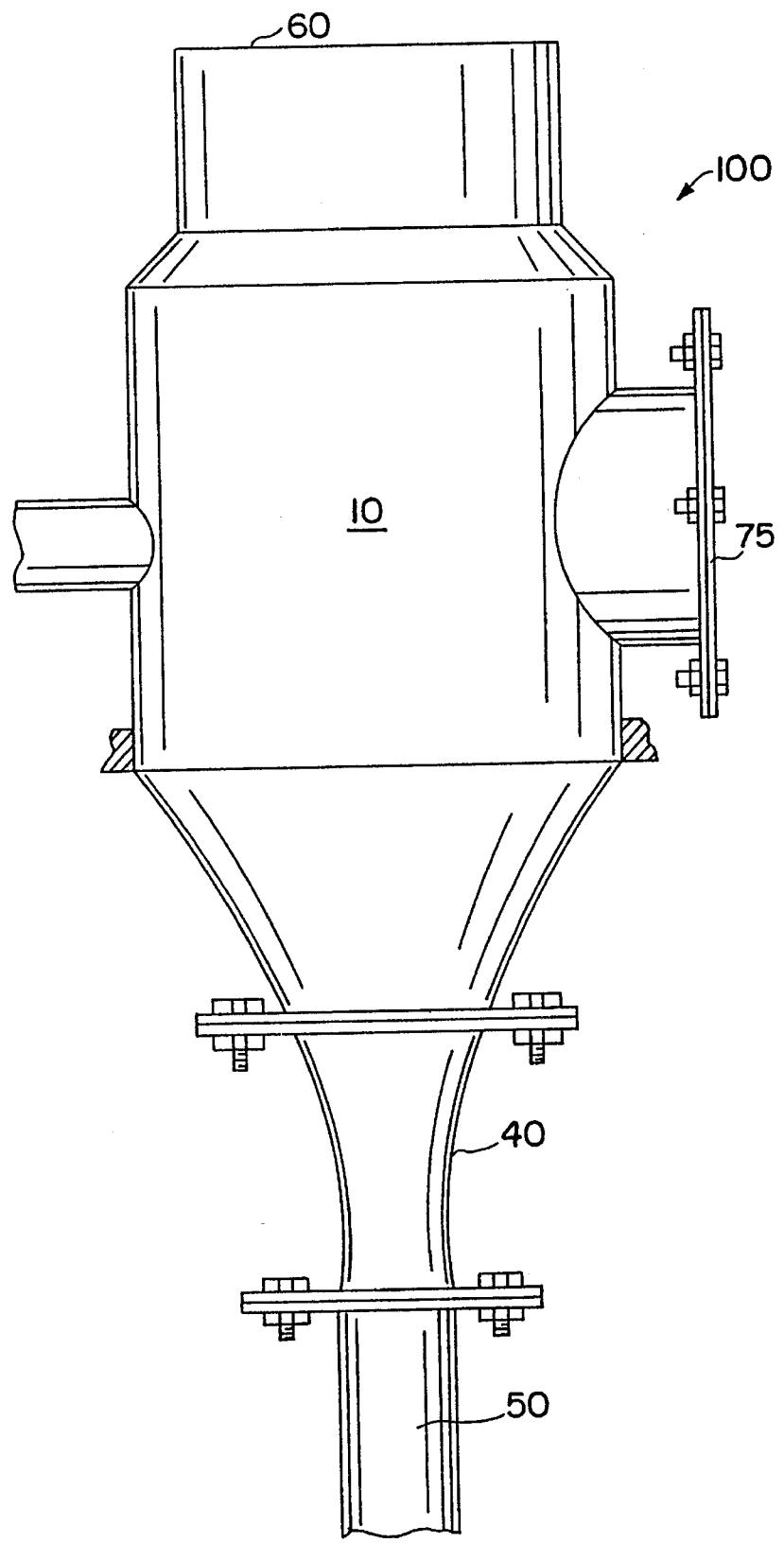
FIG. 10 is a side view of another alternative embodiment of the aeration device of the present invention.
Figure 11:
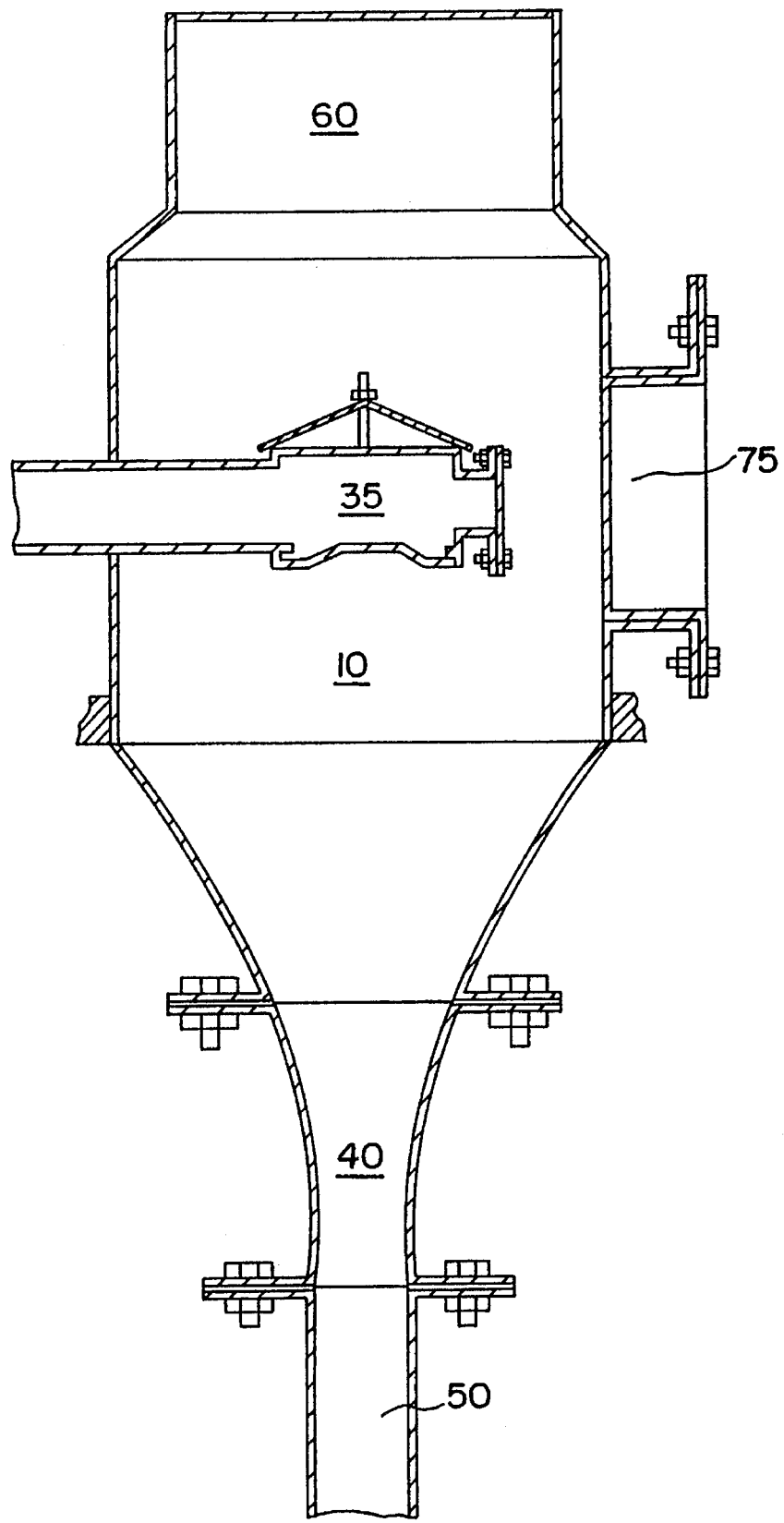
FIG. 11 is a cutaway view of the alternative embodiment of the present invention as illustrated in FIG. 10.

In another variation of the present invention, as represented by FIGS. 10 and 11, the primary distribution chamber 25 and the spray nozzles 27 are also omitted. The remainder of the elements, such as the secondary distribution chamber 35 and the high-velocity nozzles 34 as well as the orifice or opening 60 for the entrance of air, and the screen 75, retain the same arrangement as that shown in the preferred embodiment of the present invention.

Figure 12:
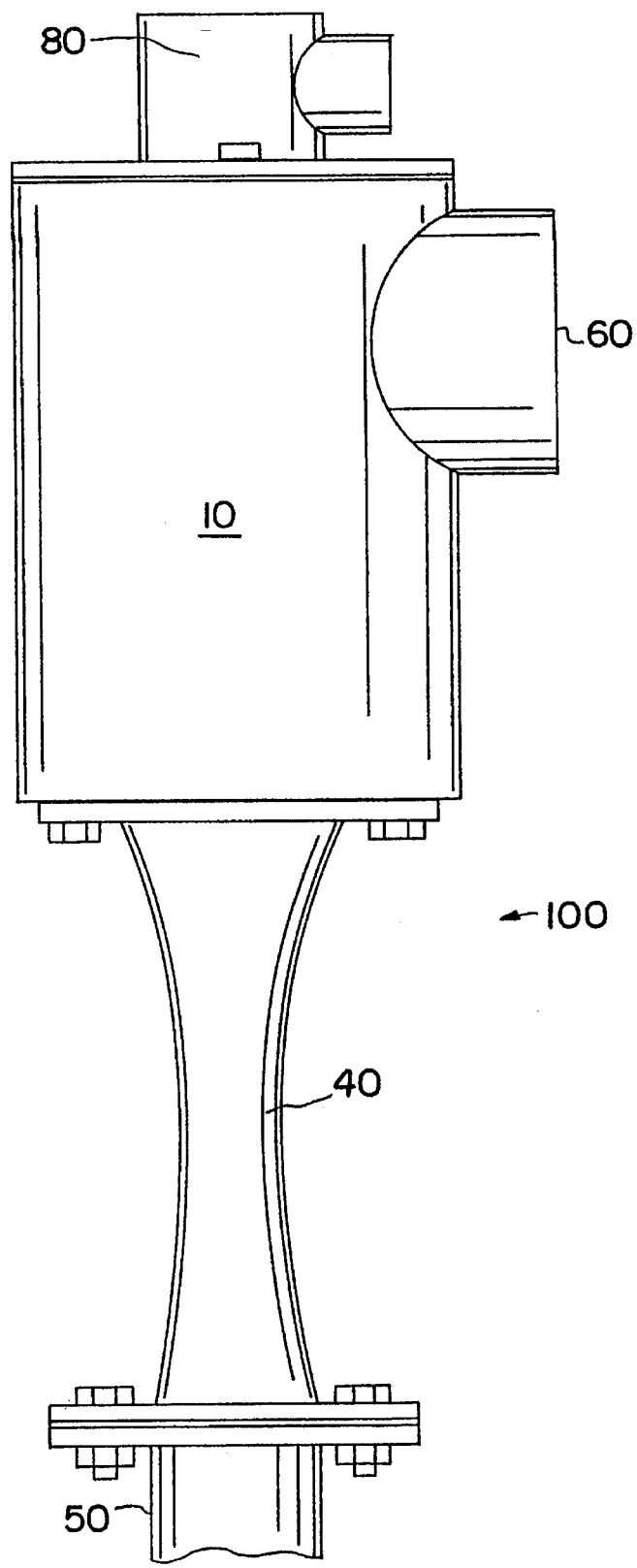
FIG. 12 is a side view of still another alternative of the present invention.
Figure 13:
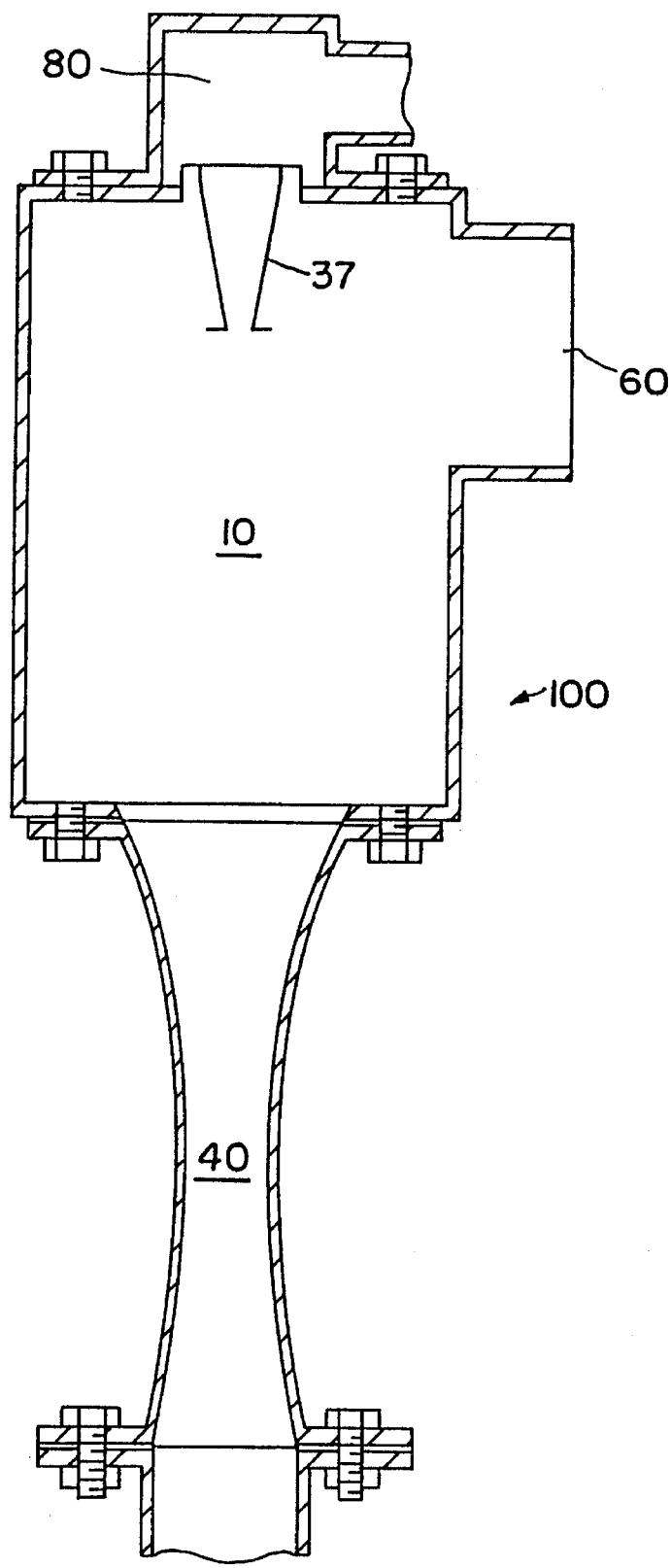
FIG. 13 is a cross-sectional view of the alternative embodiment of the present invention as shown in FIG. 12.

The fourth embodiment of the present invention, as shown in FIGS. 12 and 13, presents, at the top, a special chamber 80 for the entrance of water to be treated. This chamber may be equipped with a single nozzle at the center, and also with three, four, or up to five high-velocity nozzles 37. Orifice 60, for the entrance of air, is placed at one side of the main chamber of the device.

This embodiment of the invention is appropriate for small or medium flows. For example, with a single nozzle, between one and three liters per second can be handled. With three nozzles, between three to nine liters per second can be handled. With four nozzles, between four to twelve liters per second can be handled. With five nozzles, between five to fifteen liters per second can be handled.

Figure 3:
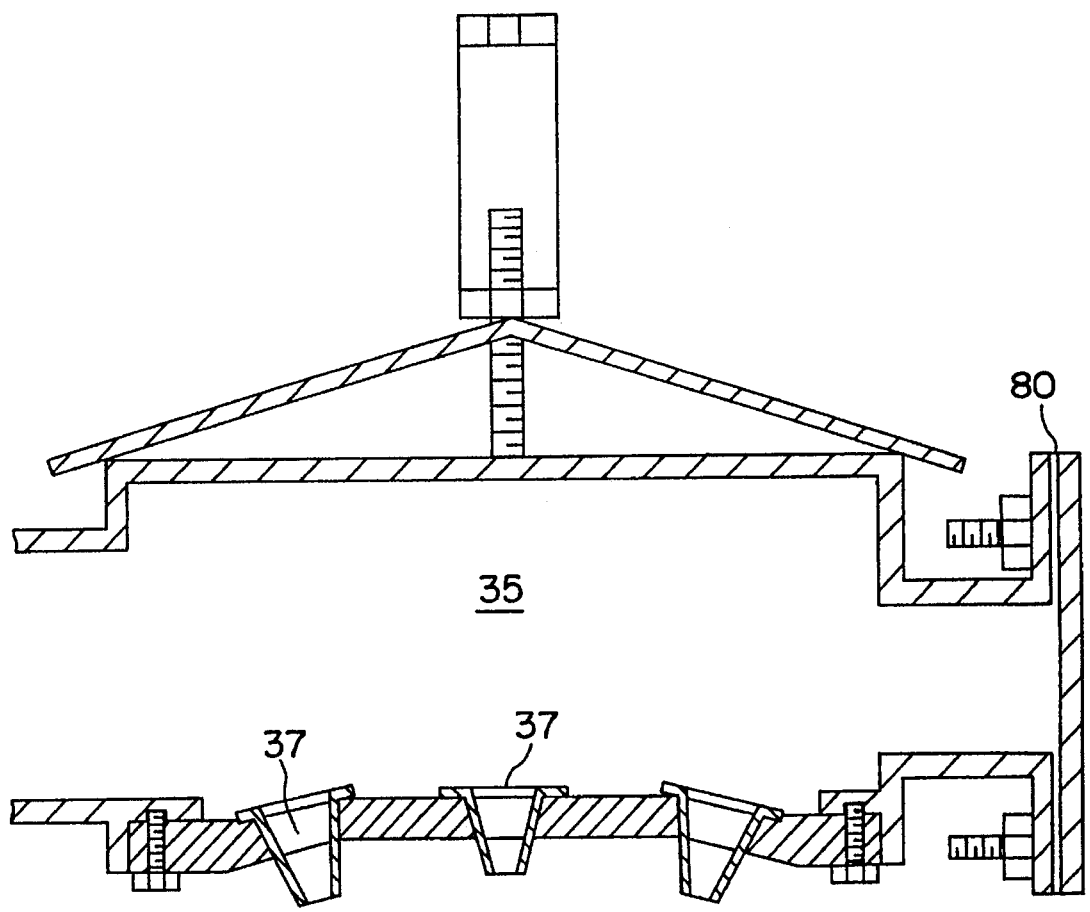
FIG. 3 is a side cutaway view of the secondary distribution chamber of the present invention.
Figure 6:
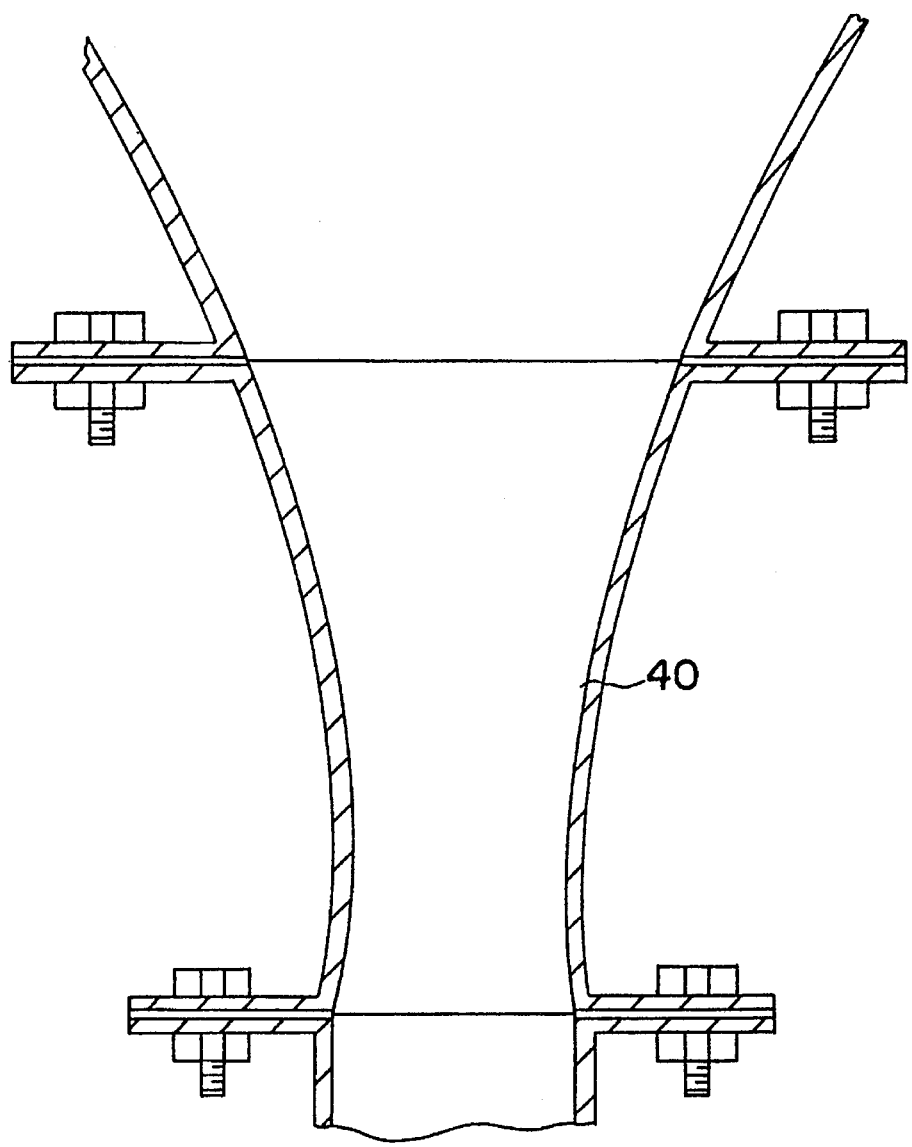
FIG. 6 is a cross-sectional side view of the venturi in accordance with the present invention.
Figure 7:
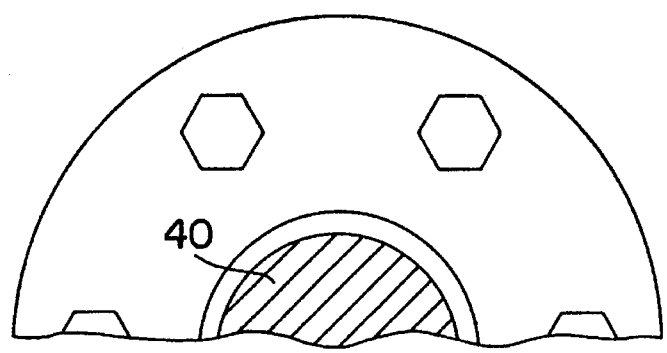
FIG. 7 is a bottom view showing the venturi in accordance with the present invention.

The three alternative embodiments of the present invention operate by the same principles of the preferred embodiment. The common elements between the alternative embodiments of the present invention and the preferred embodiment of the present invention, such as the nozzle chamber (as shown in FIG. 3), the venturi section 40, and the orifice 60, each have basically the same structure as that described and illustrated in the preferred embodiment.

The foregoing disclosure and description of the invention is illustrative and explanatory thereof. Various changes in the details of the illustrated construction or in the steps of the described method can be made within the scope of the appended claims without departing from the true spirit of the invention. The present invention should only be limited by the following claims and their legal equivalents.

I claim:

1. An aeration device, comprising:

a tubular section defining a primary chamber, said tubular section having an opening in a side thereof forming an orifice adjacent said primary chamber for the admission of ambient air from the surrounding atmosphere into said primary chamber, said tubular section having an upper peripheral edge and a lower peripheral edge;

a screen for preventing the entrance of foreign particles positioned over the orifice in said tubular section;

means defining a distribution chamber for receiving a liquid to be aerated; said distribution chamber positioned above and sealingly connected to the upper peripheral edge of said tubular section;

a plurality of high speed nozzles positioned at a top end of said primary chamber and fluidly connected to said distribution chamber for delivering accelerated sprays of liquid from said distribution chamber to said primary chamber;

a tapering section having an upper peripheral edge and a lower peripheral edge, wherein the upper peripheral edge of said tapering section is positioned below and sealingly connected to the lower peripheral edge of said tubular section, and wherein a diameter of the upper peripheral edge of said tapering section is larger than a diameter of the lower peripheral edge of said tapering section;

a venturi section including an upper peripheral edge and a lower peripheral edge, wherein the upper peripheral edge of said venturi section is positioned below and sealingly connected to the lower peripheral edge of the tapering section for accelerating the air and liquid therefrom with the entrapped air and for creating a suction at the orifice for drawing air into said primary chamber;

a single drain pipe having an upper peripheral edge that is sealingly connected to the lower peripheral edge of said venturi section, said drain pipe having a lower open end, wherein said drain pipe constitutes the sole outlet of said device such that all of the liquid and air entering said device exits said device through said drain pipe wherein said tapering section, said venturi section, and said drain pipe each have respective maximum cross sectional areas that are substantially smaller than a maximum cross sectional flow area of said primary chamber.

2. An aeration device in accordance with claim 1, wherein said distribution chamber includes an inspection door to provide access to the interior thereof.

* * * * *

UNITED STATES PATENT AND TRADEMARK OFFICE
CERTIFICATE OF CORRECTION

PATENT NO. : 5,587,113
DATED : December 24, 1996
INVENTOR(S) : Antonio Caballero Pichardo It is certified that error appears in the above-indentified patent and that said Letters Patent is hereby corrected as shown below:

Col. 5, line 55, change "homogeneods" to --homogeneous--.

Col. 6, line 26, change "3,4" to --34--.

Signed and Sealed this

Eighth Day of April, 1997

*Attest:*

BRUCE LEHMAN

*Attesting Officer*     *Commissioner of Patents and Trademarks*